US010983601B1

(12) United States Patent
Gibbins et al.

(10) Patent No.: US 10,983,601 B1
(45) Date of Patent: Apr. 20, 2021

(54) VISUALLY IMPAIRED MODE KEYPAD

(71) Applicant: ASSA ABLOY AB, Stockholm (SE)

(72) Inventors: David Gibbins, Cardiff (GB); Greg Smith, Bridgend (GB)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 16/746,160

(22) Filed: Jan. 17, 2020

(51) Int. Cl.
*G06F 3/02* (2006.01)
*G06F 3/044* (2006.01)
*G07C 9/00* (2020.01)

(52) U.S. Cl.
CPC ............ *G06F 3/0219* (2013.01); *G06F 3/044* (2013.01); *G07C 9/00309* (2013.01); *G07C 9/00944* (2013.01); *G07C 2009/00388* (2013.01); *G07C 2009/00769* (2013.01)

(58) Field of Classification Search
CPC ... G06F 3/0219; G06F 3/044; G07C 9/00309; G07C 9/00944; G07C 2009/00388; G07C 2009/00769
See application file for complete search history.

(56) References Cited

U.S. PATENT DOCUMENTS

| 10,739,859 | B2 * | 8/2020 | He | G06F 3/0488 |
| 2011/0310049 | A1 * | 12/2011 | Homma | G06F 3/04883 |
| | | | | 345/173 |
| 2012/0144299 | A1 * | 6/2012 | Patel | G06F 3/0488 |
| | | | | 715/702 |
| 2015/0302774 | A1 * | 10/2015 | Dagar | G06F 3/04886 |
| | | | | 345/173 |
| 2015/0348402 | A1 * | 12/2015 | Lim | G08C 17/02 |
| | | | | 348/734 |
| 2016/0224113 | A1 * | 8/2016 | Day | G06F 3/04886 |
| 2018/0113592 | A1 * | 4/2018 | Jakowitz | G06F 3/0488 |

* cited by examiner

*Primary Examiner* — Thomas D Alunkal
(74) *Attorney, Agent, or Firm* — Schwegman Lundberg & Woessner, P.A.

(57) ABSTRACT

This disclosure describes operations for operating a touch-sensitive keypad. The operations include: detecting, during a normal operating mode of the keypad, activation of one or more keys of the keypad, the normal operating mode causing the keypad to register a value corresponding to a given key when the given key is activated for a first amount of time; determining that the activation of the keys of the keypad satisfies a visual impaired mode criterion; in response to determining that the activation of the keys of the keypad satisfies the visual impaired mode criterion, transitioning the operating mode of the keypad from the normal operating mode to a visual impaired mode; and registering, during the visual impaired mode, the value corresponding to the given key in response to determining that the given key has been activated for a second amount of time that is longer than the first amount of time.

20 Claims, 6 Drawing Sheets

VISUALLY IMPAIRED MODE KEYPAD

FIELD OF THE DISCLOSURE

This document pertains generally, but not by way of limitation, to Physical Access Control Systems (PACS) readers and, more particularly, to techniques for operating a touch-sensitive keypad of a PACS reader.

BACKGROUND

PACS readers are used to control access in a variety of applications, such as to open doors, locks, and various other components. PACS readers can employ a radio frequency identifier (RFID) system that uses radio frequency transponders to identify an individual. Once the PACS readers identify the individual or before, a password (e.g., an alphanumeric sequence of characters) is entered on a keypad of the PACS reader. If the password matches the individual identified by the RFID system, access is granted to the individual, such as by opening the door, lock, or other component.

SUMMARY OF THE DISCLOSURE

In some certain embodiments, a system and method are provided for operating a capacitive keypad. The disclosed system and method perform operations comprising: detecting, by the keypad, during a normal operating mode of the keypad, activation of one or more keys of the keypad, the normal operating mode causing the keypad to register a value corresponding to a given key when the given key is activated for a first amount of time; determining that the activation of the one or more keys of the keypad satisfies a visual impaired mode criterion; in response to determining that the activation of the one or more keys of the keypad satisfies the visual impaired mode criterion, transitioning the operating mode of the keypad from the normal operating mode to a visual impaired mode; and registering, during the visual impaired mode, the value corresponding to the given key in response to determining that the given key has been activated for a second amount of time that is longer than the first amount of time.

In some embodiments, registering the value comprises adding the value to a string representing an access code.

In some embodiments, the operations further comprise clearing one or more values registered during the normal operating mode in response to transitioning the keypad to the visual impaired mode.

In some embodiments, the keypad comprises a capacitive touch keypad in which activation of the one or more keys is detected based on a capacitance count of the one or more keys.

In some embodiments, the keypad comprises a physical key locator element that enables a visually-impaired person to locate a specific key on the keypad when the visually-impaired person touches the physical key locator element.

In some embodiments, the physical key locator element comprises a physical dot on top of a middle key of the keypad or physical lines that are adjacent to the middle key.

In some embodiments, the visual impaired mode criterion comprises activation of the one or more keys for a threshold amount of time that is greater than the second amount of time.

In some embodiments, the visual impaired mode criterion comprises activation of a plurality of keys simultaneously for a threshold amount of time.

In some embodiments, the plurality of keys that are simultaneously activated correspond to a palm of a hand.

In some embodiments, detecting activation of one or more keys comprises detecting activation of a plurality of keys, and determining that the activation of the one or more keys of the keypad satisfies the visual impaired mode criterion comprises operations for: comparing a sensor node signal of each key of the keypad with a sensor reference signal to generate a sensor difference signal for each key of the keypad; accumulating positive values of the sensor difference signals of each of the keys; determining that the accumulated positive values exceed a threshold value; and in response to determining that the accumulated positive values exceed the threshold value, determining that the visual impaired mode criterion has been satisfied.

In some embodiments, the value corresponding to the given key is registered in response to determining that the given key has been activated for the second amount of time that is longer than the first amount of time and in response to determining that a threshold amount of pressure has been applied to the given key.

In some embodiments, the operations further include transitioning the operating mode of the keypad back to the normal operating mode in response to determining that none of the keys of the keypad has been activated for a threshold period of time.

In some embodiments, the keypad is associated with a Physical Access reader.

In some embodiments, the operations further include generating an audible prompt indicating the visual impaired mode has been activated.

In some embodiments, the operations further include generating an audible prompt in response to registering the value corresponding to the given key.

Conventional tactile-button-based keypads enable visual impaired users to locate certain buttons based on location identifiers physically disposed on the keypads. While such approaches work well for tactile button keypads that are activated by applying physical force greater than subtle touch, these approaches fail to work when applied to touch-activated keypads, such as capacitance based keypads as multiple false values would be registered as the visual impaired person subtly and unintentionally touches various other keys in search for the physical key locator. To address the shortcomings of such scenarios, the disclosed techniques employ a normal operating mode and a visual impaired operating mode for a touch-sensitive (e.g., capacitance based) keypad, where the visual impaired mode is enabled when activation of one or more keys satisfies a visual impaired mode criterion.

This overview is intended to provide an overview of subject matter of the present patent application. It is not intended to provide an exclusive or exhaustive explanation of the inventive subject matter. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
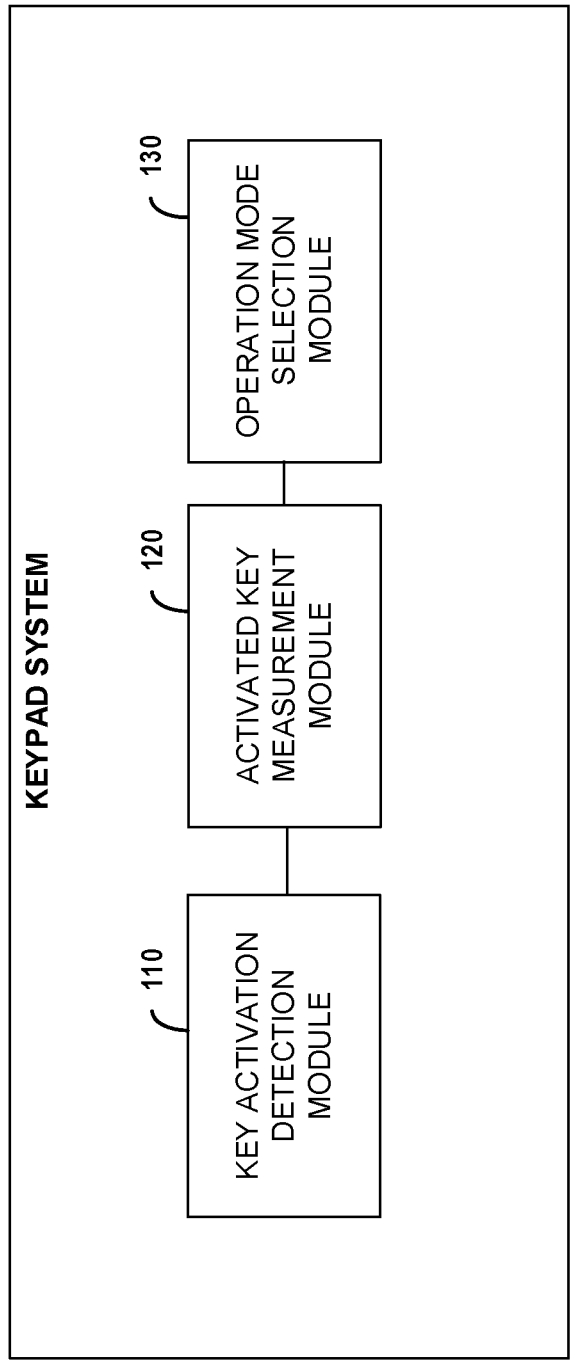
FIG. 1 is a block diagram illustrating a keypad system in accordance with various embodiments.

This disclosure describes, among other things, techniques for operating a capacitive keypad. Specifically, the disclosed techniques detect, during normal operating mode of a keypad, that activation of one or more keys of the keypad satisfies a visual impaired mode. If so, the operating mode of the keypad is transitioned to a visual impaired operating mode in which values corresponding to activated keys are registered when the given keys are activated for a longer period of time than in normal operating mode. In this way, the overall efficiency of operating the keypad is improved by reducing the number of incorrect or mistaken entries that can result from a visual impaired person interacting with the keypad. This improves the overall efficiency and functioning of the computer.

Conventional tactile-button-based keypads enable visual impaired users to locate certain buttons based on location identifiers physically disposed on the keypads. Namely, the tactile-button-based keypads register selections of values corresponding to selected keys, when the keys are physically pressed with sufficient force to close a switch. Visual impaired users need not worry about mistakenly causing values to be registered while searching for a particular key because such users can lightly touch the keypad keys without applying enough force to the keys to close the switches and register values of the switches. Such users can be educated about the layout of the keypad (e.g., the users can be informed about where different numbered keys are physically disposed on the keypad relative to one or more other numbers) and the users can find a particular locator number to then select other numbers of interest.

For example, a center key, such as the number 5 key on the keypad, can include a physical bump that allows the visual impaired person to locate the number 5 key by subtly touching keys of the keypad until the physical bump is identified. The user can then find other keys for physical selection, by applying more force than the subtle touch, based on the identified location of the number 5 key. While such approaches work well for tactile button keypads that are activated by applying physical force greater than subtle touch, these approaches fail to work when applied to touch-activated keypads, such as capacitance based keypads. This is because in the touch-activated keypads, multiple false values are registered as the visual impaired person subtly and unintentionally touches various other keys in search for the physical key locator (e.g., the bump on the number 5 key). Namely, the user cannot, using subtle touch, navigate to their desired key as this would often result in other keys (non-desired) registering a keystroke.

To address the shortcomings of such typical scenarios, the disclosed techniques employ a normal operating mode and a visual impaired operating mode for a touch-sensitive (e.g., capacitance based) keypad. During normal operating mode of a keypad, activation of one or more keys of the keypad is detected that causes values to be registered as the key is touched for a first amount of time (e.g., 100 milliseconds or less). A determination is made as to whether the activation of the one or more keys satisfies a visual impaired mode, such as if multiple keys are simultaneously pressed to form a particular shape (e.g., a shape of a hand), and/or if one of the keys is activated for a threshold period of time (e.g., 6 seconds), and/or if one of the keys is pressed with a threshold amount of force. In response to determining that the activation of the one or more keys satisfies the visual impaired mode, the operating mode of the keypad is transitioned to a visual impaired operating mode in which values corresponding to activated keys are registered only when the given keys are activated for a longer period of time than in normal operating mode. For example, during the visual impaired mode, values corresponding to the keys are registered when activation of the corresponding keys is detected for a second amount of time (e.g., at least one second). In this way, the disclosed techniques enable visual impaired users to operate a touch-sensitive keypad without unintentionally registering incorrect values as the users search for a particular locator key. As such, the overall efficiency and functioning of the computer is improved.

FIG. 1 is a block diagram illustrating a keypad system 100 according to some embodiments. As illustrated, the keypad system 100 includes a key activation detection module 110, an activated key measurement module 120, and an operation mode selection module 130. The keypad system 100 also includes a memory for storing one or more registered key values and an RFID reader (not shown).

The keypad system 100 can be a stationary unit, such as wall mounted proximity readers, or a portable unit that can be easily relocated. The keypad system 100 includes a microcontroller (not shown) implemented using a digital processing device, such as a general purpose microprocessor, a digital signal processor, a reduced instruction set computer, a complex instruction set computer, or a field programmable gate array. The microcontroller may implement some or all the functions of the modules shown and described in connection with the keypad system 100.

The keypad system 100 may be a touch-sensitive keypad which is configured to register keystrokes based on subtle touch. Namely, a user can select one or more keys of the keypad by subtly touching the key rather than pressing a physical key. The keypad system 100 may be implemented as a capacitive-based keypad and/or a resistance-based keypad which register keystrokes and values corresponding to different keys when a capacitance or resistance change is detected.

The key activation detection module 110 is configured to detect activation of one or more keys of the keypad based on a digital count corresponding to each key. Specifically, each key of the keypad may be associated with a capacitance-based sensor. The key activation detection module 110 can convert the capacitance of each key sensor to a digital count. Based on the value of the digital count, the key activation detection module 110 determines whether the corresponding key is activated or not. Particularly, when a user physically touches a particular key, the capacitance value of the sensor changes which results in a certain digital count being generated. If the physical touch is of a certain force or covers sufficient physical region of a given key, the digital count may be increased. For example, when a finger touches (or comes near) the sensor corresponding to a particular key, the finger introduces a finger capacitance in parallel with a parasitic capacitance of the key. In some implementations, the key activation detection module 110 uses a switched-capacitor circuit to convert the sensor capacitance (including any finger capacitance) to an equivalent resistor. Then a Sigma-Delta modulator converts the current measured through the resistor to a digital count. When a finger is on the sensor, the capacitance increases and the equivalent resistance decreases. This causes an increase in the current through the resistor, resulting in an increase in the digital count.

In some embodiments, the key activation detection module 110 may determine if the digital count matches or exceeds a digital count threshold. If the digital count is less than a single key threshold (e.g., less than 40-50 counts), the key activation detection module 110 considers the key activation to be noise and does not register a keystroke for the key. If the digital count exceeds a single key threshold, the key activation detection module 110 detects activation of that key. In some cases, the key activation detection module 110 detects multiple keys being activated when a digital count that is computed exceeds a multiple key threshold (e.g., greater than 512 counts). The multiple key threshold may be greater than the single key threshold. In some implementations, the key activation detection module 110 computes a multiple key threshold that corresponds to a particular shape of a user's body part touching the keypad (e.g., a shape of a hand). The shape of the body part may correspond to 6 different keys and the key activation detection module 110 computes the multiple key threshold as a sum of the single key thresholds of each of the 6 different keys. When the key activation detection module 110 determines that a digital count that is generated exceeds the multiple key threshold, the key activation detection module 110 may determine that the shape of the body part has touched the keypad (e.g., that the user's hand has touched the keypad).

For example, the key activation detection module 110 compares a sensor node signal of each key of the keypad with a sensor reference signal to generate a sensor difference signal for each key of the keypad. The key activation detection module 110 accumulates positive values of the sensor difference signals of each of the keys and determines that the accumulated positive values exceed a threshold value (e.g., the multiple key threshold). In response to determining that the accumulated positive values exceed the threshold value, the key activation detection module 110 determines that the keys that are activated correspond to the shape of the body part and that a visual impaired mode criterion has been satisfied.

The activated key measurement module 120 receives from the key activation detection module 110 an indication that a particular key or one or more keys of the keypad have been activated. The key activation detection module 110 may also indicate which key or one or more keys have been activated and their corresponding values. For example, if the number 6 key was touched by a user's finger, the key activation detection module 110 may signal to the activated key measurement module 120 that the digital count corresponding to the single key threshold for the number 6 key has been met.

The activated key measurement module 120 measures how long the particular key of set of keys has been activated. During normal operating mode, the activated key measurement module 120 registers or stores the value of the activated key(s) in a memory or buffer if the particular key has been activated for a first amount of time (e.g., 100 milliseconds or less). The activated key measurement module 120 may also generate an audible alert of a first type (e.g., a 100 ms sound or beep) to indicate to the user that the value of the activated key has been registered. To determine if the key has been activated for the first amount of time, the activated key measurement module 120 sums or accumulates the count (over a number of samples taken over time) taken over a specified period of time (e.g., the preceding 1 sec) and if that total count is over a threshold, the activated key measurement module 120 determines that the key has been activated for the first amount of time. For example, to determine if a key has been activated for 100 milliseconds, the activated key measurement module 120 can sample the count value for the key 10 times every second. Each time the activated key measurement module 120 samples the count value (e.g., 15 counts), the activated key measurement module 120 accumulates the count value with the previous count values sampled during the 10 times per second interval. After the interval elapses, if the accumulated count values exceeds a threshold (e.g., 45 counts), the activated key measurement module 120 determines that the key has been activated for the first amount of time. Any other suitable sampling interval and threshold can be chosen.

In some embodiments, the activated key measurement module 120 determines if the one or more keys that are activated satisfy a visual impaired mode criterion. For example, the activated key measurement module 120 may determine if the length of time that the particular key has been activated exceeds a visual impaired mode threshold (e.g., if the key has been activated for more than 5 seconds). As another example, the activated key measurement module 120 may determine if the shape of the keys that are activated or if the amount of keys that are activated corresponds to a visual impaired mode. Specifically, the activated key measurement module 120 may determine if the shape of the keys correspond to a user's hand and in such cases the shape corresponds to the visual impaired mode. As another example, the activated key measurement module 120 may determine if the pressure applied to the particular key that is activated exceeds a visual impaired mode threshold (e.g., if the digital count value of the activated key matches a pressure threshold that exceeds the single key threshold by a specified amount, such as a pressure threshold that is greater than the single key threshold but is less than a multiple key threshold).

In some embodiments, in response to determining that the one or more keys that are activated satisfy a visual impaired mode criterion, the activated key measurement module 120 instructs the operation mode selection module 130 to transition to the visual impaired mode from the normal operating mode. The operation mode selection module 130 generates an audible alert (e.g., a long beep or 400 ms sound) to inform the user that the operation mode of the keypad system 100 has been changed to the visual impaired mode. In some cases, the operation mode selection module 130, in addition to or in alternative to, generating the audible alert to inform the user that the operation mode of the keypad system 100 has been changed to the visual impaired mode, may visually indicate that the visual impaired mode has been activated (e.g., by changing the color of one or more light emitting diodes (LEDs) of the keypad). Also, in response to transitioning from the normal operating mode to the visual impaired mode, any previously registered keystroke values that are stored in the memory or buffer are cleared and deleted. In this way, if the user accidentally touched one or more other keys, during normal operating mode, in search for a locator key (e.g., the number 5 key with a physical locator button), any values that were unintentionally registered as keystrokes from the one or more other keys are deleted and not used in the password entry of the keypad system 100. This allows a user to search for the locator key on the touch-sensitive keypad while the keypad operates in normal mode and registers keystrokes and then allows the user to enter the password after the locator key is found without having to clear out manually any values that were inadvertently and unintentionally registered.

During visual impaired mode, the activated key measurement module 120 registers or stores the value of the activated key(s) in a memory or buffer if the particular key has been activated for a second amount of time (e.g., one second or more). Also, during the visual impaired mode, the activated key measurement module 120 outputs an audible alert of a second type (e.g., a 200 ms sound or beep) when the activated key measurement module 120 registers or stores the value of the activated key. This allows the user to navigate the keypad and touching various keys without having the values of the keys registered as keystrokes as the user touches the keys trying to find the keys the user is interested in selecting. Once the user finds the key of interest, the user can touch the key for a longer period of time with the intent of having the value corresponding to the key being registered and stored in the buffer as part of the password or passcode.

The activated key measurement module 120 may determine that no keys have been activated for a threshold period of time. For example, after registering a value for a given key during the visual impaired mode, the activated key measurement module 120 may reset a timer. The timer may be reset each time a value is registered for a given key in the visual impaired mode. When the activated key measurement module 120 determines that the timer has reached a threshold (e.g., 5 seconds), the activated key measurement module 120 instructs the operation mode selection module 130 to transition to the normal operating mode from the visual impaired mode. The operation mode selection module 130 generates an audible alert (e.g., a long beep or 400 ms sound) to inform the user that the operation mode of the keypad system 100 has been changed to the normal operating mode. In this way, the keypad system 100 automatically returns to normal operating mode when a given user finishes operating the keypad system 100 in visual impaired mode. This simplifies subsequent selection of keys by another user who may not be visually impaired and may not need to operate the keypad in visual impaired mode.

In some embodiments, a processor of the keypad system 100 compares the password or passcode in the memory or buffer (e.g., the string of characters and/or numbers that are registered) to one or more previously stored passwords or passcodes. In response to determining that the password or passcode matches any one of the previously stored passwords or passcodes, the processor authorizes access to the component (e.g., door or lock) associated with the keypad system 100. In some cases, the processor of the keypad system 100 detects an RFID prior to, concurrently with, or after the password or passcode has been entered. In such cases, the processor determines whether a previously stored password or passcode associated with the detected RFID matches the password or passcode that is entered in the keypad system 100 to determine whether to grant access.

Figure 2A:
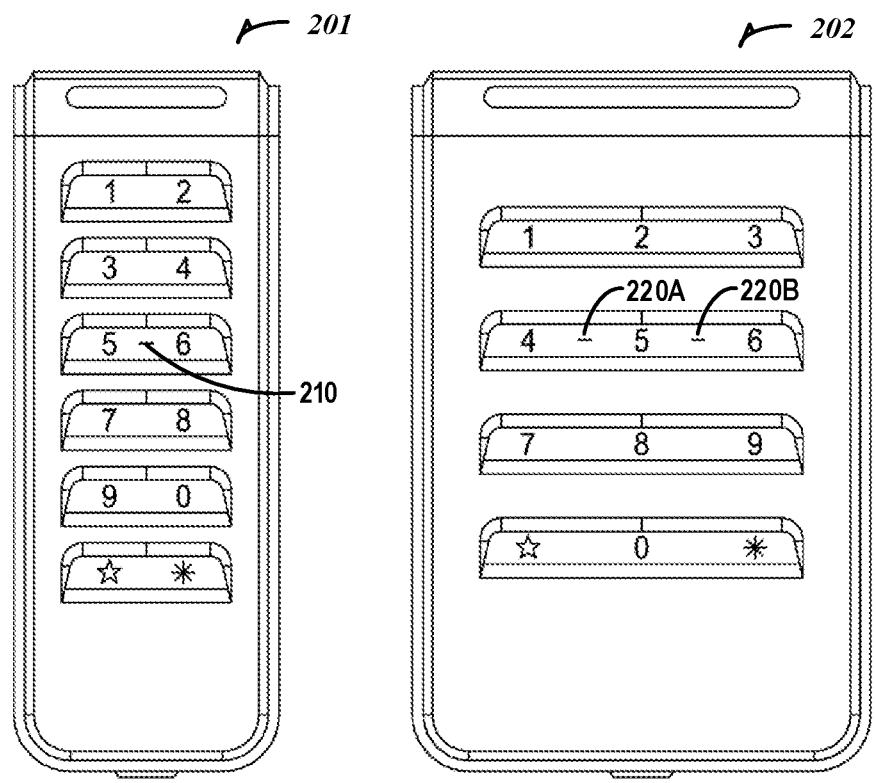
FIG. 2A is a block diagram illustrating keypad reader units for use in the keypad system in accordance with various embodiments.

FIG. 2A is a block diagram illustrating keypad reader units for use in the keypad system in accordance with various embodiments. Keypad unit 201 shows a first layout of keys on a keypad. A first locator 210 is included in the keypad unit 201. The first locator 210 may be a physical bump, pimple, line or other suitable physical shape that a visually impaired user recognizes by touch as being in a specific position of the first layout. The first locator 210 allows the user to identify where other keys on the keypad are placed by being informed previously about the layout and the relative positions of the other keys in relation to the first locator 210. In the keypad unit 201, the first locator 210 is placed between the keys for the numbers 5 and 6.

Keypad unit 202 shows a second layout of keys on a keypad. Second locators 220A and 220B are included in the keypad unit 202. The second locators 220A and 220B may be physical bumps, pimples, lines or other suitable physical shapes that a visually impaired user recognizes by touch as being in a specific position of the second layout. The second locators 220A and 220B allow the user to identify where other keys on the keypad are placed by being informed previously about the layout and the relative positions of the other keys in relation to the second locators 220A and 220B. In the keypad unit 202, the second locators 220A and 220B are placed adjacent to the key for the number 5. Namely, the second locator 220A is placed on the left side of the key for the number 5 and the second locator 220B is placed on the right side of the key for the number 5.

Figure 2B:
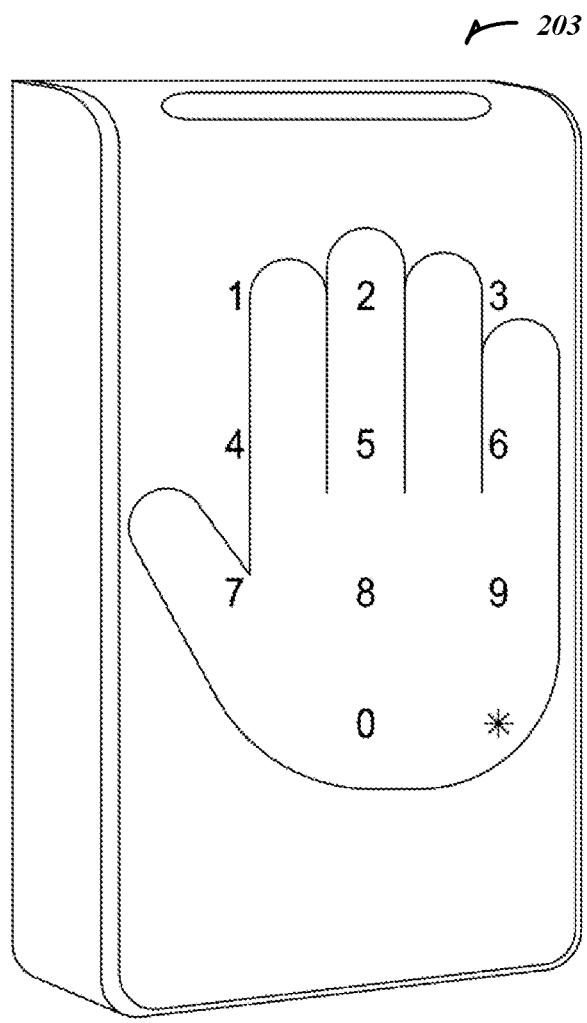
FIG. 2B is an illustrative visual impair mode selection gesture applied to the keypad system in accordance with various embodiments.

FIG. 2B is an illustrative visual impaired mode selection gesture applied to the keypad system 203 in accordance with various embodiments. As an example, a hand that simultaneously activates multiple keys in the shape of the hand is detected. An imprint of the hand and the portion of the keypad that the hand touches is shown which causes multiple keys to be activated. When a multiple key threshold is met by the count values generated as a result of the keys activated by the hand on the keypad system 203, the visual impaired mode is activated (e.g., the keypad system 100 transitions to the visual impaired mode from the normal operating mode).

Figure 3A:
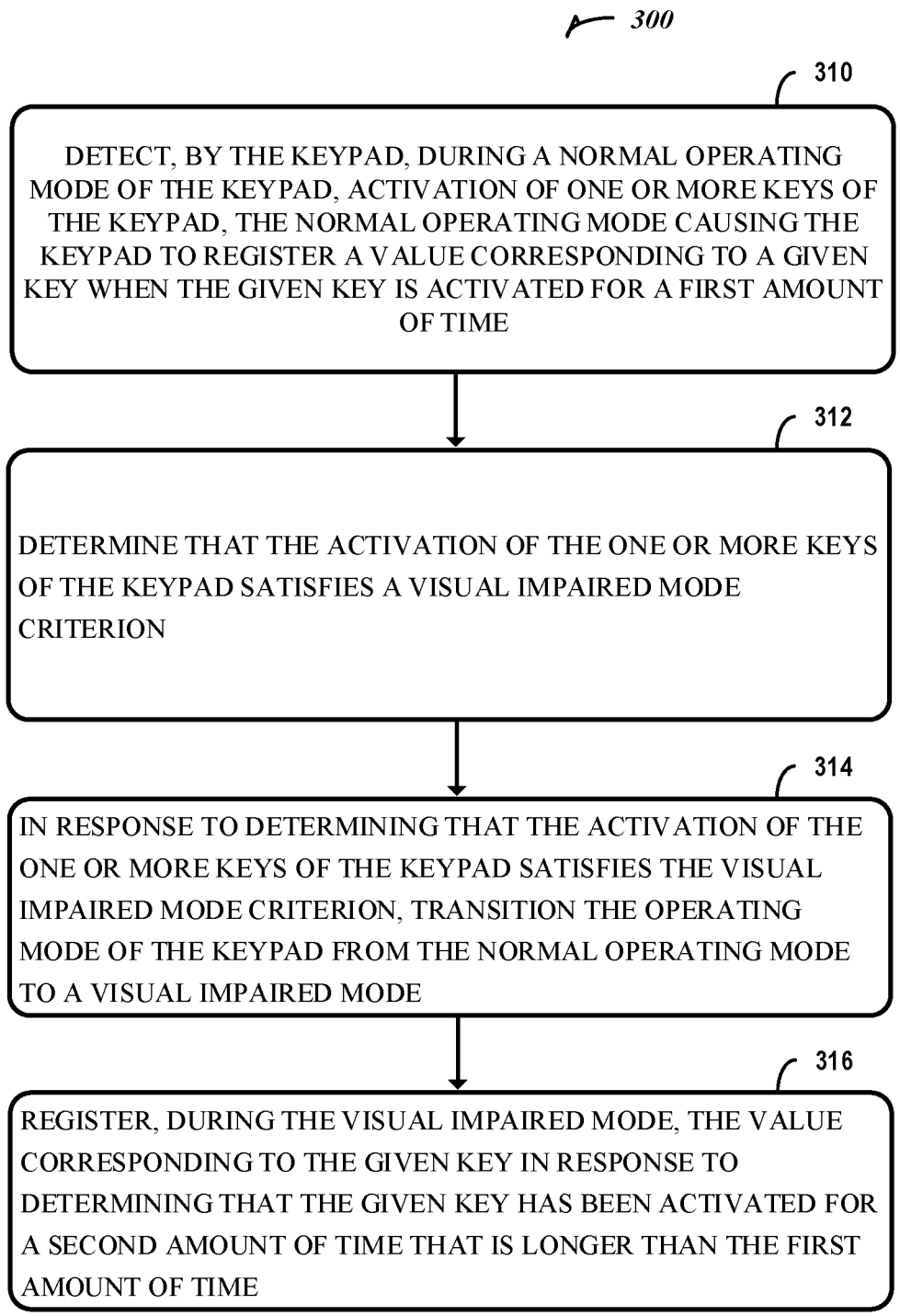
FIGS. 3A-3B are flow diagrams depicting example processes for operating the keypad in accordance with various embodiments.

FIG. 3A is a flow diagram depicting an example process 300 for operating the keypad system 100 in accordance with various embodiments.

At operation 310, the keypad system 100 detects, during a normal operating mode of the keypad, activation of one or more keys of the keypad, the normal operating mode causing the keypad to register a value corresponding to a given key when the given key is activated for a first amount of time.

At operation 312, the keypad system 100 determines that the activation of the one or more keys of the keypad satisfies a visual impaired mode criterion.

At operation 314, the keypad system 100, in response to determining that the activation of the one or more keys of the keypad satisfies the visual impaired mode criterion, transitions the operating mode of the keypad from the normal operating mode to a visual impaired mode.

At operation 316, the keypad system 100 registers, during the visual impaired mode, the value corresponding to the given key in response to determining that the given key has been activated for a second amount of time that is longer than the first amount of time.

Figure 3B:
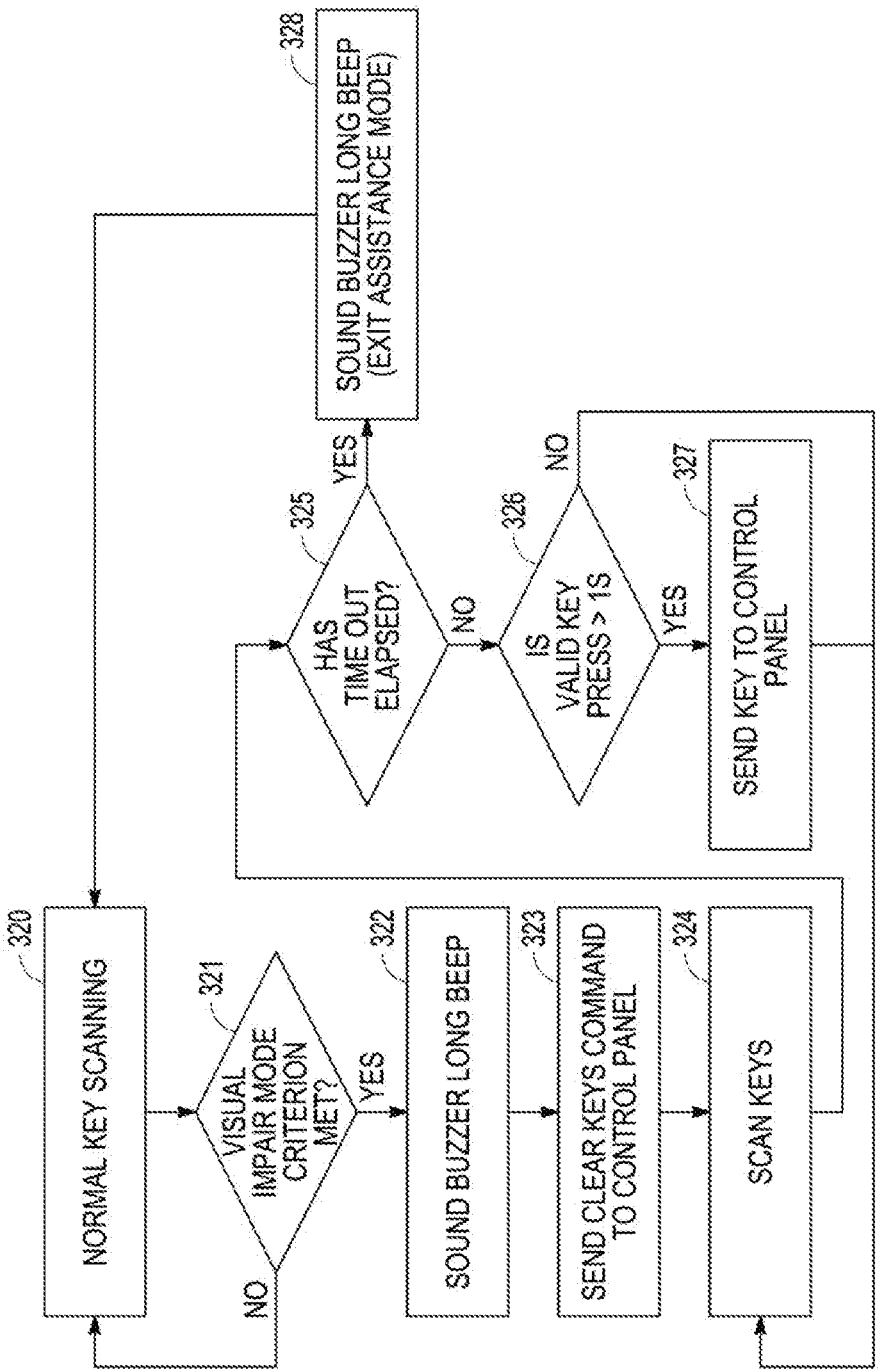

FIG. 3B is a flow diagram depicting an example process 301 for operating the keypad system 100 in accordance with various embodiments.

At operation 320, the keypad system 100 performs normal scanning and detection of activation of keys in normal operating mode. Namely, the keypad system 100 registers values of keys that are activated for a first amount of time (e.g., 100 milliseconds).

At operation 321, the keypad system 100 determines if a visual impaired mode criterion is met. If the visual impaired mode criterion is met, the keypad system 100 proceeds to operation 322; otherwise the keypad system 100 proceeds to operation 320. For example, the keypad system 100 determines if a key has been activated for more than a threshold amount of time (e.g., a finger lingers on a key for more than 5 seconds). In another example, the keypad system 100 determines if a certain number of multiple keys in a particular shape have been activated and if such keys have been activated for a threshold amount of time (e.g., a hand is placed on the keypad for more than 2 seconds).

At operation 322, the keypad system 100 sounds a buzzer long beep if the visual impaired mode criterion is determined to have been met.

At operation 323, the keypad system 100 sends a clear keys command to the control panel. Specifically, the keypad system 100 clears any previously registered key values if the visual impaired mode criterion is determined to have been met to avoid including inadvertent key strokes in the password or passcode.

At operation 324, the keypad system 100 scans keys in a visual impaired mode. For example, the keypad system 100 registers values of keys that are activated for a second amount of time (e.g., 1 second or more).

At operation 325, the keypad system 100 determines if a timeout period has elapsed since the last value of the last key that has been activated has been registered in the visual impaired mode. If the timeout period has elapsed, the keypad system 100 continues to operation 328; otherwise the keypad system proceeds to operation 326.

At operation 328, the keypad system 100 sounds a buzzer long beep indicating that the visual impaired mode has been deactivated and that the normal operating mode has been enabled.

At operation 326, the keypad system 100 determines if a valid key has been activated or pressed for more than the second amount of time. If the valid key has not been pressed for more than the second amount of time, the keypad system 100 returns to operation 324 to scan the keys in the visual impaired mode.

At operation 327, the keypad system 100 sends the key to the control panel to register the value of the valid key that has been determined to be activated or pressed for more than the second amount of time and proceeds to operation 324 to continue scanning keys.

Figure 4:
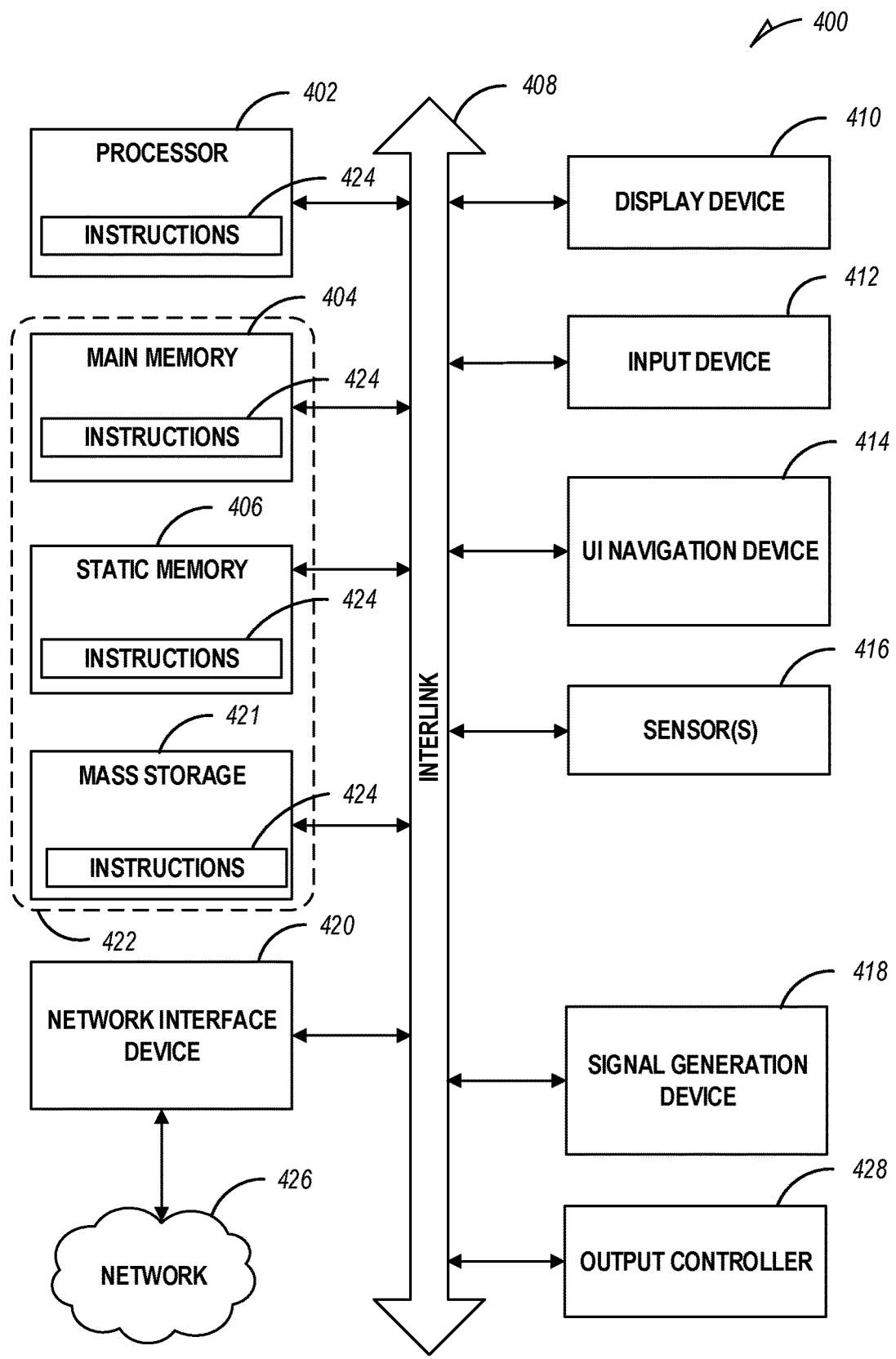
FIG. 4 is a block diagram illustrating an example of a machine upon which one or more embodiments may be implemented.

FIG. 4 is a block diagram of an example machine 400 upon which any one or more of the techniques (e.g., methodologies) discussed herein may be performed and/or that may be included as part of the keypad reader 100. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in a peer-to-peer (P2P) (or other distributed) network environment. The machine 400 may be a personal computer (PC), a tablet PC, a set-top box (STB), a personal digital assistant (PDA), a mobile telephone, a web appliance, an IoT device, an automotive system, an aerospace system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant-massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 400 may include a hardware processor 402 (e.g., a central processing unit (CPU), a graphics processing unit (GPU), a hardware processor core, or any combination thereof, such as a memory controller, etc.), a main memory 404, and a static memory 406, some or all of which may communicate with each other via an interlink (e.g., bus) 408. The machine 400 may further include a display device 410, an alphanumeric input device 412 (e.g., a keyboard), and a user interface (UI) navigation device 414 (e.g., a mouse). In an example, the display device 410, alphanumeric input device 412, and UI navigation device 414 may be a touchscreen display. The machine 400 may additionally include a storage device 422 (e.g., drive unit); a signal generation device 418 (e.g., a speaker); a network interface device 420; one or more sensors 416, such as a Global Positioning System (GPS) sensor, wing sensors, mechanical device sensors, temperature sensors, ICP sensors, bridge sensors, audio sensors, industrial sensors, a compass, an accelerometer, or other sensors. The machine 400 may include an output controller 428, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The storage device 422 may include a machine-readable medium on which is stored one or more sets of data structures or instructions 424 (e.g., software) embodying or utilized by any one or more of the techniques or functions described herein. The instructions 424 may also reside, completely or at least partially, within the main memory 404, within the static memory 406, or within the hardware processor 402 during execution thereof by the machine 400. In an example, one or any combination of the hardware processor 402, the main memory 404, the static memory 406, or the storage device 421 may constitute the machine-readable medium.

While the machine-readable medium is illustrated as a single medium, the term "machine-readable medium" may include a single medium or multiple media (e.g., a centralized or distributed database, or associated caches and servers) configured to store the one or more instructions 424.

The term "machine-readable medium" may include any transitory or non-transitory medium that is capable of storing, encoding, or carrying transitory or non-transitory instructions for execution by the machine 400 and that cause the machine 400 to perform any one or more of the techniques of the present disclosure, or that is capable of storing, encoding, or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 (e.g., software, programs, an operating system (OS), etc.) or other data that are stored on the storage device 421 can be accessed by the main memory 404 for use by the hardware processor 402. The main memory 404 (e.g., DRAM) is typically fast, but volatile, and thus a different type of storage from the storage device 421 (e.g., an SSD), which is suitable for long-term storage, including while in an "off" condition. The instructions 424 or data in use by a user or the machine 400 are typically loaded in the main memory 404 for use by the hardware processor 402. When the main memory 404 is full, virtual space from the storage device 421 can be allocated to supplement the main memory 404; however, because the storage device 421 is typically slower than the main memory 404, and write speeds are typically at least twice as slow as read speeds, use of virtual memory can greatly reduce user experience due to storage device latency (in contrast to the main memory 404, e.g., DRAM). Further, use of the storage device 421 for virtual memory can greatly reduce the usable lifespan of the storage device 421.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, and wireless data networks (e.g., Institute of Electrical and Electronics Engineers (IEEE) 802.11 family of standards known as Wi-Fi®, IEEE 802.16 family of standards known as WiMax®, IEEE 802.15.4 family of standards, peer-to-peer (P2P) networks), among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any tangible or intangible medium that is capable of storing, encoding, or carrying instructions for execution by the machine 400, and includes digital or analog communications signals or other tangible or intangible media to facilitate communication of such software.

Each of the non-limiting aspects or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the inventive subject matter may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended; that is, a system, device, article, composition, formulation, or process that includes elements in addition to those listed after such a term in a claim are still deemed to fall within the scope of that claim. Moreover, in the following claims, the terms "first," "second," "third," etc., are used merely as labels, and are not intended to impose numerical requirements on their objects.

Method examples described herein may be machine- or computer-implemented at least in part. Some examples may include a computer-readable medium or machine-readable medium encoded with transitory or non-transitory instructions operable to configure an electronic device to perform methods as described in the above examples. An implementation of such methods may include code, such as microcode, assembly-language code, a higher-level-language code, or the like. Such code may include transitory or non-transitory computer-readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read-only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above detailed description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the detailed description as examples or embodiments, with each claim standing on its own as a separate embodiment, and it is contemplated that such embodiments may be combined with each other in various combinations or permutations. The scope of the inventive subject matter should be determined with reference to the appended claims, along with the full scope of equivalents to which such claims are entitled.

What is claimed is:

1. A method for operating a keypad, the method comprising:
   detecting, by one or more processors of the keypad, during a normal operating mode of the keypad, activation of one or more keys of the keypad, the normal operating mode causing the keypad to register a value corresponding to a given key when the given key is activated for a first amount of time;
   determining that activation of one or more keys of the keypad satisfies a visual impaired mode criterion;
   in response to determining that activation of one or more keys of the keypad satisfies the visual impaired mode criterion, transitioning the operating mode of the keypad from the normal operating mode to a visual impaired mode;
   automatically clearing one or more values registered during the normal operating mode in response to transitioning the keypad to the visual impaired mode; and
   after automatically clearing the one or more values, registering, during the visual impaired mode, a value corresponding to the given key in response to determining that the given key has been activated for a second amount of time that is longer than the first amount of time.

2. The method of claim 1, wherein registering the value comprises adding the value to a string representing an access code.

3. The method of claim 1, further comprising:
   determining that activation of one or more keys of the keypad satisfies a visual impaired mode criterion by detecting that a plurality of keys of the keypad have been simultaneously activated; and
   transitioning the operating mode of the keypad from the normal operating mode to the visual impaired mode in response to detecting that the plurality of keys of the keypad have been simultaneously activated.

4. The method of claim 3, wherein the keypad comprises a capacitive touch keypad in which activation of the plurality of more keys is detected based on a capacitance count of the plurality of keys.

5. The method of claim 1, wherein the keypad comprises a physical key locator element that enables a visually-impaired person to locate a specific key on the keypad when the visually-impaired person touches the physical key locator element.

6. The method of claim 5, wherein the physical key locator element comprises a physical bump or line on top of a middle key of the keypad or adjacent to the middle key.

7. The method of claim 1, wherein the visual impaired mode criterion comprises activation of one or more keys for a threshold amount of time that is greater than the second amount of time, further comprising transitioning the operating mode of the keypad from the normal operating mode to the visual impaired mode in response to detecting that the one or more keys of the keypad have been activated for the threshold amount of time.

8. The method of claim 1, wherein the visual impaired mode criterion comprises activation of a plurality of keys simultaneously for a threshold amount of time.

9. The method of claim 8, wherein the plurality of keys that are simultaneously activated correspond to at least a portion of a palm of a hand pressed against the keypad.

10. The method of claim 1, wherein detecting activation of one or more keys comprises detecting simultaneous activation of a plurality of keys, and wherein determining that activation of the plurality of keys of the keypad satisfies the visual impaired mode criterion comprises:
    comparing a sensor node signal of each key of the keypad with a sensor reference signal to generate a sensor difference signal for each key of the keypad;
    accumulating positive values of the sensor difference signals of each of the plurality of keys, that are simultaneously activated, the accumulated positive values being greater than a positive value associated with the sensor difference signal of a particular key of the keypad;
    determining that the accumulated positive values exceed multiple key threshold value; and
    in response to determining that the accumulated positive values exceed the multiple key threshold value, determining that the visual impaired mode criterion has been satisfied.

11. The method of claim 1, wherein in the visual impaired mode, the value corresponding to the given key is registered in response to determining that the given key has been activated for the second amount of time that is longer than the first amount of time and in response to determining that a threshold amount of pressure has been applied to the given key.

12. The method of claim 1, further comprising transitioning the operating mode of the keypad back to the normal operating mode in response to determining that none of the keys of the keypad has been activated for a threshold period of time.

13. The method of claim 1, wherein the keypad is associated with a Physical Access Control reader.

14. The method of claim 1, further comprising generating an audible prompt indicating the visual impaired mode has been activated.

15. The method of claim 1, further comprising generating an audible prompt in response to registering the value corresponding to the given key.

16. A system comprising:
a keypad comprising one or more processors configured to perform operations comprising:
detecting, by the keypad, during a normal operating mode of the keypad, activation of one or more keys of the keypad, the normal operating mode causing the keypad to register a value corresponding to a given key when the given key is activated for a first amount of time;
determining that activation of one or more keys of the keypad satisfies a visual impaired mode criterion;
in response to determining that activation of one or more keys of the keypad satisfies the visual impaired mode criterion, transitioning the operating mode of the keypad from the normal operating mode to a visual impaired mode;
automatically clearing one or more values registered during the normal operating mode in response to transitioning the keypad to the visual impaired mode; and
after automatically clearing the one or more values, registering, during the visual impaired mode, a value corresponding to the given key in response to determining that the given key has been activated for a second amount of time that is longer than the first amount of time.

17. The system of claim 16, wherein the operations for registering the value comprise operations for adding the value to a string representing an access code.

18. The system of claim 16, wherein the operations further comprise:
determining that activation of one or more keys of the keypad satisfies a visual impaired mode criterion by detecting that a plurality of keys of the keypad have been simultaneously activated; and
transitioning the operating mode of the keypad from the normal operating mode to a visual impaired mode in response to detecting that the plurality of keys of the keypad have been simultaneously activated.

19. A non-transitory machine-readable medium comprising non-transitory machine-readable instructions that, when executed by one or more processors, configure the one or more processors to perform operations comprising:
detecting, by a keypad, during a normal operating mode of the keypad, activation of one or more keys of the keypad, the normal operating mode causing the keypad to register a value corresponding to a given key when the given key is activated for a first amount of time;
determining that activation of one or more keys of the keypad satisfies a visual impaired mode criterion;
in response to determining that activation of one or more keys of the keypad satisfies the visual impaired mode criterion, transitioning the operating mode of the keypad from the normal operating mode to a visual impaired mode;
automatically clearing one or more values registered during the normal operating mode in response to transitioning the keypad to the visual impaired mode; and
after automatically clearing the one or more values, registering, during the visual impaired mode, a value corresponding to the given key in response to determining that the given key has been activated for a second amount of time that is longer than the first amount of time.

20. The non-transitory machine-readable medium of claim 19, wherein the operations for registering the value comprise operations for adding the value to a string representing an access code.

\* \* \* \* \*